(12) United States Patent
Han

(10) Patent No.: US 11,905,628 B2
(45) Date of Patent: Feb. 20, 2024

(54) CUT RESISTANT FABRIC

(71) Applicant: Honeywell International Inc., Charlotte, NC (US)

(72) Inventor: Lei Han, Shanghai (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/066,779

(22) Filed: Dec. 15, 2022

(65) Prior Publication Data

US 2023/0109776 A1 Apr. 13, 2023

Related U.S. Application Data

(62) Division of application No. 17/249,543, filed on Mar. 4, 2021, now Pat. No. 11,560,648.

(30) Foreign Application Priority Data

Feb. 3, 2021 (CN) .......................... 202110147256.5

(51) Int. Cl.
| | | |
|---|---|---|
| *D03D 1/00* | (2006.01) | |
| *D03D 15/283* | (2021.01) | |
| *D03D 15/242* | (2021.01) | |
| *C08K 3/34* | (2006.01) | |
| *C08K 7/00* | (2006.01) | |
| *C08K 9/06* | (2006.01) | |
| *D03D 7/00* | (2006.01) | |

(52) U.S. Cl.
CPC .............. *D03D 1/0041* (2013.01); *C08K 3/34* (2013.01); *C08K 7/00* (2013.01); *C08K 9/06* (2013.01); *D03D 7/00* (2013.01); *D03D 15/247* (2021.01); *D03D 15/283* (2021.01); *C08L 2207/068* (2013.01); *D10B 2101/02* (2013.01); *D10B 2321/0211* (2013.01); *D10B 2401/063* (2013.01); *D10B 2501/041* (2013.01); *D10B 2501/042* (2013.01)

(58) Field of Classification Search
CPC .......... D03D 1/0041; C08K 3/34; C08K 7/00; C08K 9/06
USPC ......................................................... 442/301
See application file for complete search history.

(56) References Cited

U.S. PATENT DOCUMENTS

| | | | | |
|---|---|---|---|---|
| 2011/0082262 | A1* | 4/2011 | Yeh | C08J 5/005 |
| | | | | 525/333.7 |
| 2013/0125283 | A1* | 5/2013 | Henssen | C08J 7/043 |
| | | | | 2/2.5 |

FOREIGN PATENT DOCUMENTS

| | | |
|---|---|---|
| CN | 107141659 A | 9/2017 |
| CN | 108948481 A | 12/2018 |
| CN | 109575569 A | 4/2019 |
| EP | 2308922 A1 | 4/2011 |

OTHER PUBLICATIONS

Decision to grant a European patent dated Jul. 13, 2023 for EP Application No. 22151495, 2 page(s).
EP Office Action dated Aug 2, 2022 for EP Application No. 22151495.
Ex Parte Quayle Action dated Jul. 8, 2022 for U.S. Appl. No. 17/249,543.
Notice of Allowance and Fees Due (PTOL-85) dated Oct. 5, 2022 for U.S. Appl. No. 17/249,543.
Notice of Allowance and Fees Due (PTOL-85) dated Sep. 20, 2022 for U.S. Appl. No. 17/249,543.
Panin, et al. (2020). Effect of Adhesion on Mechanical and Tribological Properties of Glass Fiber Composites, Based on Ultra-High Molecular Weight Polyethylene Powders with Various Initial Particle Sizes. Materials. 13. 1602. 10.3390/ma13071602.
Requirement for Restriction/Election dated Jan. 19, 2022 for U.S. Appl. No. 17/249,543.
U.S. Appl. No. 17/249,543, filed Mar. 4, 2021, Issued.
Intention to grant dated Mar. 13, 2023 for EP Application No. 22151495, 22 page(s).
Extended European Search Report dated Oct. 12, 2023 for EP Application No. 23181066, 6 page(s).

* cited by examiner

*Primary Examiner* — Deve V Hall
(74) *Attorney, Agent, or Firm* — Alston & Bird LLP

(57) ABSTRACT

A cut resistant fabric and a method of manufacturing a cut resistant fiber is disclosed herein. The fabric comprises a Ultra High Molecular Weight Polyethylene (UHMWPE) material and a sheet shaped wollastonite filler. The sheet shaped wollastonite filler is treated with a coupling agent and mixed with the UHMWPE material. A thickness of the sheet shaped wollastonite filler is less than 10 micrometers (μm). The method comprises providing the sheet shaped wollastonite filler having a thickness of less than 10 μm and treating the sheet shaped wollastonite filler with a coupling agent at a first predefined temperature to obtain a uniform solution. The method further comprises mixing the uniform solution with a fiber solution comprising UHMWPE resin at a second predefined temperature.

5 Claims, 3 Drawing Sheets

CUT RESISTANT FABRIC

CROSS-REFERENCE TO RELATED APPLICATIONS

This application is a divisional of U.S. patent application Ser. No. 17/249,543, filed on Mar. 4, 2021 and entitled "CUT RESISTANT FABRIC," which claims priority to and the benefit of foreign Chinese Patent Application No. 202110147256.5, filed on Feb. 3, 2021 with the China National Intellectual Property Administration and entitled "CUT RESISTANT FABRIC," each of which is incorporated herein by reference in its entirety.

TECHNOLOGICAL FIELD

Example embodiments of the present disclosure relate generally to a cut resistant fabric, and more particularly, to a cut resistant fabric having Ultra High Molecular Weight Polyethylene (UHMWPE) resin.

BACKGROUND

Cut resistant fabrics provide cut protection, tear and abrasion resistance against sharp or jagged objects and are widely used in various applications. The applications range from making protective clothing, industrial gloves, helmets, to high strength ropes, and packaging metal and glass articles. Such cut resistant fabrics are composed of polymeric and non-polymeric fibers, such as high tenacity polyester, nylon, and gel spun fibers, and thermoplastic polyethylene fibers, such as Ultra High Molecular Weight Polyethylene (UHMWPE) fibers.

For manufacturing a cut resistant fabric, the polymeric and non-polymeric fibers and the polyethylene fibers are treated with fillers and combined with raw materials in a spinning process to obtain cut resistant fibers. The cut resistant fibers are woven or knitted to obtain the cut resistant fabric.

The Applicant has identified several technical challenges associated with the cut resistant fabric comprising UHMWPE fiber. Through applied effort, ingenuity, and innovation, many of these identified challenges have been overcome by developing solutions that are included in embodiments of the present disclosure, many examples of which are described in detail herein.

BRIEF SUMMARY

The illustrative embodiments of the present disclosure relate to a cut resistant fabric used for manufacturing industrial gloves having high cut resistance and wear comfort for users. The cut resistant fabric comprises an Ultra High Molecular Weight Polyethylene (UHMWPE) material, such as UHMWPE fibers or a UHMWPE resin, and a sheet shaped wollastonite filler. The sheet shaped wollastonite filler is treated with a coupling agent and mixed with the UHMWPE material. The sheet shaped wollastonite filler has a thickness of less than 10 micrometers ($\mu m$).

In some embodiments, the sheet shaped wollastonite filler has a length less than 100 $\mu m$ and a width less than 50 $\mu m$.

In some embodiments, the sheet shaped wollastonite filler has a Mohs hardness higher than 4.5, and a silica content higher than 50%.

In some embodiments, the coupling agent comprises at least one of gamma-Aminopropyltriethoxysilane (KH550), and polyorganosiloxane (Penta-1006).

In an example embodiment, a proportion of the sheet shaped wollastonite filler in the cut resistant fabric ranges from 2.5% to 5% by volume.

In an example embodiment, a method for preparing a cut resistant fiber is provided. The method comprises providing a sheet shaped wollastonite filler having a thickness of less than 10 $\mu m$. The method comprises treating the sheet shaped wollastonite filler with a coupling agent at a first predefined temperature to obtain a uniform solution and mixing the uniform solution with a fiber solution comprising UHMWPE resin at a second predefined temperature.

In an example embodiment, obtaining the uniform solution comprises mixing a dispersing agent with the sheet shaped wollastonite filler to obtain a mixture of the dispersing agent and the sheet shaped wollastonite filler and adding the mixture of the dispersing agent and the sheet shaped wollastonite filler to a white oil. The white oil being a fiber spinning solvent.

In some embodiments, the sheet shaped wollastonite filler has a length less than 100 $\mu m$, and a width less than 50 $\mu m$.

In an example embodiment, the first predefined temperature is 80° Celsius (C) and the second predefined temperature is 140° C.

In an example embodiment, the coupling agent comprises at least one of gamma-Aminopropyltriethoxysilane (KH550), and polyorganosiloxane (Penta-1006).

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
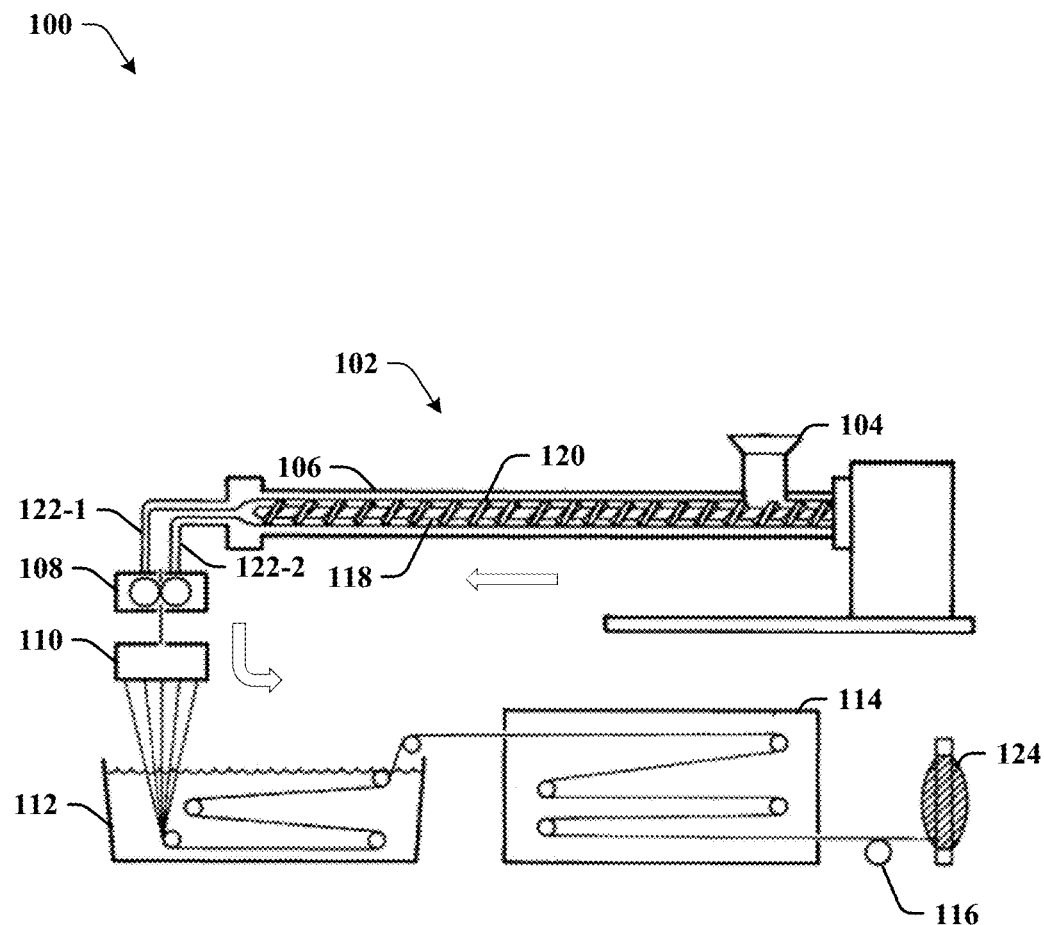
FIG. 1 illustrates an assembly line for manufacturing a cut resistant fabric, in accordance with an example embodiment of the present disclosure.

Some embodiments of the present disclosure will now be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

Fabrics used for various industrial applications, such as industrial gloves, high strength ropes, packaging glass and metal articles and personal protective equipment have high strength, durability and cut resistance. The fabrics are generally made of polyester fibers or polyethylene fibers including Ultra High Molecular Weight Polyethylene (UHMWPE) fibers that provide strength, and flexibility to the fabrics. Such cut resistant fabrics are typically manufactured using composite yarns that include the UHMWPE fibers blended with other materials for hardness of the fabrics. For instance, the UHMWPE fibers are mixed with glass fibers to achieve high cut resistance levels. The UHMWPE fibers are also blended with rod-shaped hard fillers for example, short fibers or nano rods during a spinning process. For many applications, the UHMWPE fibers are also mixed with stainless-steel material to achieve a predetermined hardness for the fabrics.

However, blending the UHMWPE fibers with glass fibers, rod-shaped fibers or stainless-steel material make the fabrics brittle and cause the fabrics to crack or break during manufacturing and use by a user. The breaking of the fabrics during manufacturing, on many instances, causes damage to a manufacturing equipment resulting in increased cost. Industrial gloves made from such fabrics are generally uncomfortable in wearing and cause allergy to the user. Further, manufacturing the fabrics with such composite yarns is time-consuming and complex.

Various example embodiments described in the present disclosure relate to a cut resistant fabric that is hard, flexible and provides wear comfort to users. The cut resistant fabric is composed of UHMWPE resin and a filler, for instance, a sheet shaped wollastonite filler. The UHMWPE resin are combined with the sheet shaped wollastonite filler in the spinning process at a predefined temperature to obtain the cut resistant fabric. The sheet shaped wollastonite filler has a predefined dimension, such as a sheet shape, and a thickness less than 10 micrometers (μm). The sheet shaped wollastonite filler has a length less than 100 μm and a width less than 50 μm. The sheet shaped wollastonite filler has a Mohs hardness, which is indicative of scratch resistance of a surface, higher than 4.5 and a silica content higher than 50% by volume. In an example, the thickness of the sheet shaped wollastonite filler is selected to be lower than the thickness of the UHMWPE fibers to allow mixing of the filler with the UHMWPE resin.

The predefined dimension allows an anisotropic arrangement of the sheet shaped wollastonite filler with the UHMWPE resin that facilitates even distribution and mixture of the filler with the UHMWPE resin. Further, the sheet shaped wollastonite filler reduces breakage in the fabric by reducing overall stress distribution of the UHMWPE resin during manufacturing or knitting and improves shear strength of the fabric. The sheet shaped wollastonite filler shows improved mixing with other raw materials during the spinning process and glove manufacturing.

In an example embodiment, prior to mixing with the UHMWPE resin, the sheet shaped wollastonite filler is treated with a coupling agent, for instance a silane coupling agent. The silane coupling agent provides improved bonding and compatibility between the filler and the UHMWPE resin.

The fabric comprising the UHMWPE resin and the sheet shaped wollastonite filler exhibits flexibility and strength and is used for various applications, such as glove knitting, industrial ropes and handling glass and metal articles. The fabric is also light-weighted and finds application in armor design, such as vehicle armor and protective helmets and vests.

The details regarding manufacturing of the fabric using an assembly line system is described with reference to subsequent figures and description.

The components illustrated in the figures represent components that may or may not be present in various example embodiments described herein such that embodiments may include fewer or more components than those shown in the figures while not departing from the scope of the disclosure.

Turning now to the drawings, the detailed description set forth below in connection with the appended drawings is intended as a description of various example configurations and is not intended to represent the only configurations in which the concepts described herein may be practiced. The detailed description includes specific details for the purpose of providing a thorough understanding of various concepts with like numerals denoting like components throughout the several views. However, it will be apparent to those skilled in the art of the present disclosure that these concepts may be practiced without these specific details.

FIG. 1 illustrates an assembly line 100 for manufacturing a cut resistant fabric in accordance with an example embodiment of the present disclosure. As shown in FIG. 1, the assembly line 100 comprises a continuous extruder 102 having a hopper or an inlet 104, an extruder die 106, a metering pump 108, a spinneret 110, a quenching and extraction bath 112, an oven 114, and a roller 116.

In an example, the extruder die 106 comprises a mandrel 118 disposed concentrically to the extruder die 106 within the extruder die 106, and an extrusion screw 120 disposed on the mandrel 118. The mandrel 118 is rotatable along an axis within the extruder die 106. In an example embodiment, the continuous extruder 102 comprises multiple heaters (not shown in the figure) placed on an inner surface of the extruder die 106 to heat materials fed to the continuous extruder 102. The extruder die 106 has outlets 122-1 and 122-2 and each of the outlets 122-1 and 122-2 is coupled to the metering pump 108. An outlet of the metering pump 108 is coupled to the spinneret 110. Although FIG. 1 illustrates a single spinneret 110 coupled to the metering pump 108, in various other embodiments there may be multiple spinnerets, each spinneret being coupled to the metering pump 108. The assembly line 100 is arranged such that the spinneret 110 is coupled to the quenching and extraction bath 112 and the quenching and extraction bath 112 is coupled to the oven 114. The assembly line 100 comprises the roller 116 positioned adjacent to the oven 114.

For manufacturing a cut resistant fabric, an Ultra High Molecular Weight Polyethylene (UHMWPE) material, such as UHMWPE fibers or a UHMWPE resin of a specific dimension or a particle size are dissolved into a fiber spinning solvent. The UHMWPE resin may be in form of either granules, pellets or a powder. In an example embodiment, the UHMWPE resin, in a powdered form, is dissolved into the fiber spinning solvent. The particle size of the UHMWPE resin is within a range from 80 μm to 200 μm and molecular weight is in a range from $1 \times 10^6$ to $8 \times 10^6$. The fiber spinning solvent, for instance, is a white oil or a paraffin oil. After dissolving the UHMWPE resin in the fiber spinning solvent, a fiber solution is obtained. The fiber solution has a consistent viscosity. The fiber solution is fed to the continuous extruder 102 via the inlet 104.

Figure 2A:
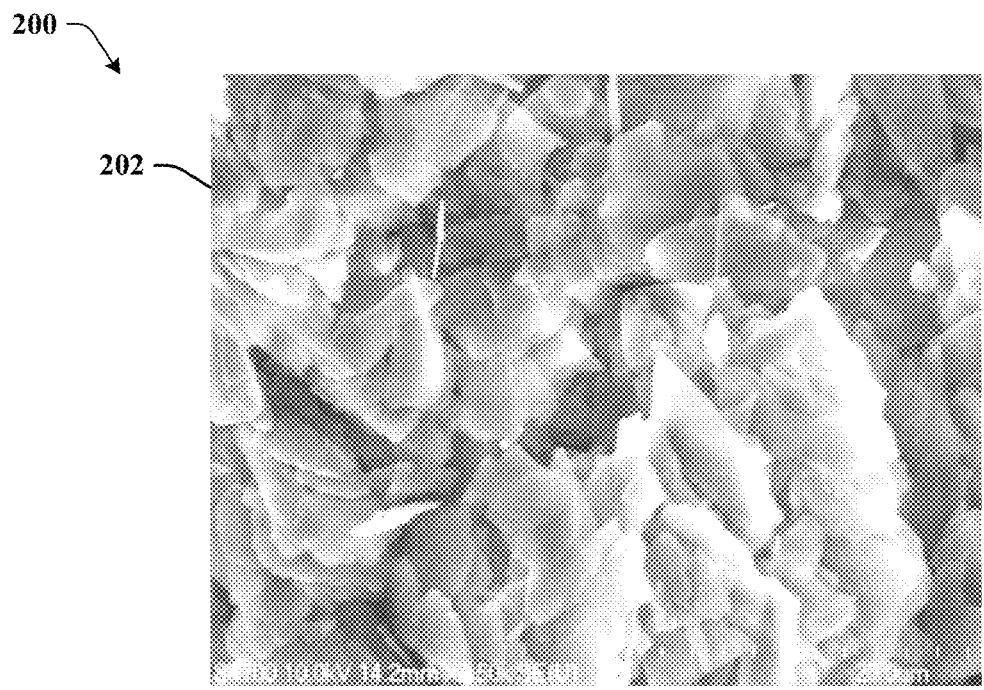
FIGS. 2A and 2B are views of a sheet shaped wollastonite filler, in accordance with an example embodiment of the present disclosure.
Figure 2B:
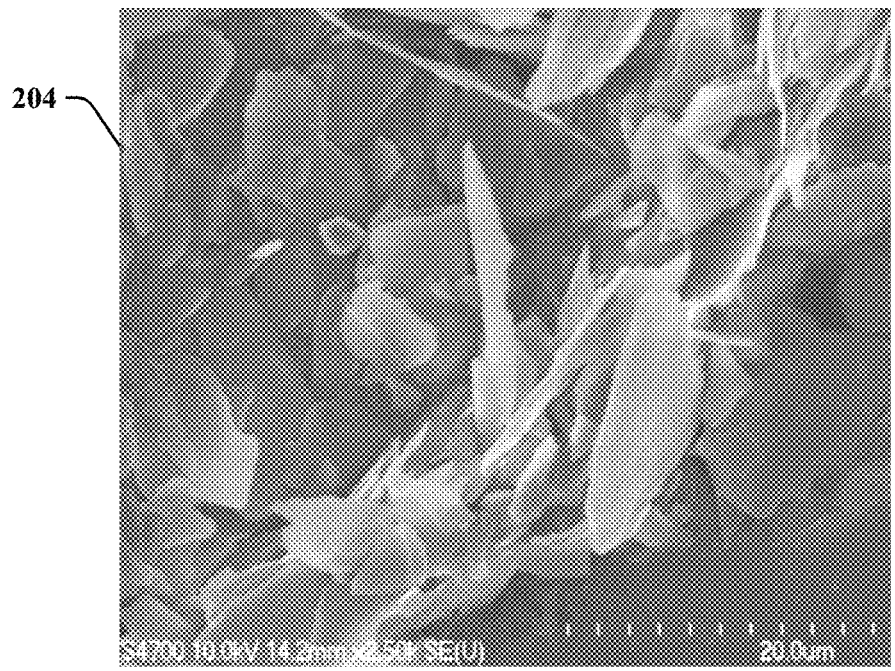

In an example, a filler, for instance a sheet shaped wollastonite filler is treated with a silane coupling agent, prior to mixing the filler with the fiber solution. The sheet shaped wollastonite filler is illustrated in FIGS. 2A and 2B in accordance with an example embodiment of the present disclosure. FIGS. 2A and 2B show a microscopic view of the composition and structure of the sheet shaped wollastonite filler. FIG. 2A shows a lower resolution view 202 of the composition and structure of the sheet shaped wollastonite filler and FIG. 2B shows a higher resolution view 204 of the sheet shaped wollastonite filler.

The sheet shaped wollastonite filler has a predefined dimension having a thickness of less than 10 micrometers ($\mu$m), a length of less than 100 $\mu$m, and a width of less than 50 $\mu$m. The thickness of the sheet shaped wollastonite filler is selected such that the sheet shaped wollastonite filler can be properly mixed with the UHMWPE fibers. Further, the sheet shaped wollastonite filler has a Mohs hardness higher than 4.5, and a silica content higher than 50% by volume. The Mohs hardness of 4.5 or higher provides a predetermined hardness to the fabric for manufacturing cut resistant fabrics. Such hardness improves shear modulus of constituent fibers thereby increasing the shear strength of the fabrics. The sheet shaped wollastonite filler having the predefined dimension provides an anisotropic arrangement of the filler with the UHMWPE resin. Such an arrangement provides improved strength to the cut resistant fabric and reduces breakage and stress distribution of fibers during the spinning process.

The silane coupling agent is one of a gamma-Aminopropyltriethoxysilane (KH550) agent, and a polyorganosiloxane (Penta-1006) agent. Treating the sheet shaped wollastonite filler with the silane coupling agent improves compatibility and interfacing between the sheet shaped wollastonite filler and the UHMWPE resin.

Referring to FIG. 1, a uniform solution is obtained by mixing the sheet shaped wollastonite filler and the silane coupling agent. A dispersing agent is also added to the uniform solution to improve stability of the uniform solution and surface compatibility of the sheet shaped wollastonite filler and the silane coupling agent. In an example, a content of the dispersing agent within the uniform solution is in a range of 0.03% to 0.5% by volume. The uniform solution is fed to the continuous extruder 102 via the inlet 104. The uniform solution having the sheet shaped wollastonite filler and the silane coupling agent is mixed and blended with the fiber solution comprising the UHMWPE resin and the fiber spinning solvent in the continuous extruder 102.

In operation, the mandrel 118 and the extrusion screw 120 of the continuous extruder 102 rotate to blend the fiber solution and the uniform solution. The mixing and blending is performed in a continuous manner based on the rotation and a mixture of the fiber solution and the uniform solution is being pushed towards the outlets 122-1 and 122-2 of the continuous extruder 102. In an example, the heaters (not shown in the figure) disposed within the inner surface of the extruder die 106 heat the mixture to a temperature, for instance, 80° Celsius (° C.) for coherent blending. In an example, the mixture is blended and heated at 80° C. for two hours in the extruder die 106.

The mixture, after the blending, is supplied to the metering pump 108 via the outlets 122-1 and 122-2 of the extruder die 106. In an example, the outlets 122-1 and 122-2 have narrower tubes than the extruder die 106 and some pressure is applied to the mixture to reach the metering pump 108 via the outlets 122-1 and 122-2. In an example, the metering pump 108 segregates the mixture into two or more portions and supplies each portion of the mixture to a spinneret, such as the spinneret 110. In an example embodiment having the multiple spinnerets coupled to the metering pump 108, each spinneret receives a portion of the mixture from the metering pump 108.

At the spinneret 110, the mixture is filtered to remove impurities from the mixture and then supplied to the quenching and extraction bath 112. The mixture is delivered to water pipes disposed within the quenching and extraction bath 112 to lower the temperature of the mixture and form a gel. The gel comprises solvents, such a paraffin oil and other solvent, such as xylene. After the gel passes through the water pipes and before entering the oven 114, the xylene is extracted from the gel to lower a paraffin content in the gel. Thereafter, at the oven 114, the gel is heated at a high temperature, for instance, 140° C. for drying the gel to remove the paraffin content. A drawing operation of fibers is performed through the roller 116. In various example embodiments, the drawing operation is performed, at a draw ratio of 35. Towards the end of the drawing operation, a yarn 124 of fibers is obtained. The fibers obtained have high cut and abrasion resistance property and are woven or knitted to obtain the cut resistant fabric. In various example embodiments, the fibers have cut resistance to achieve European EN388 2016 Level C or American Society for Testing and Materials (ASTM) F2292 A3 level and are suitable for manufacturing 13-gauge industrial gloves.

Figure 3:
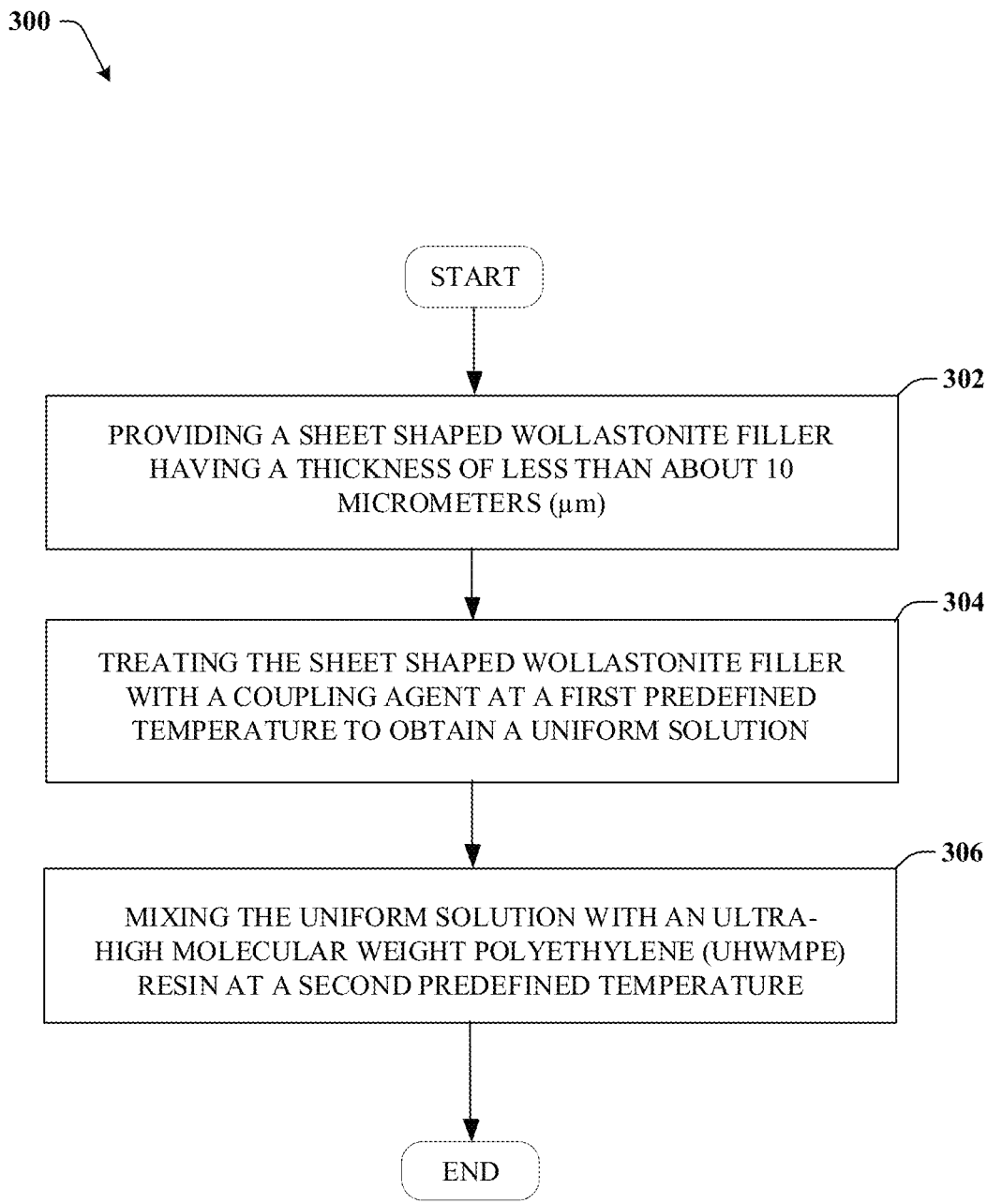
FIG. 3 is a flow chart illustrating a method for manufacturing a fiber, in accordance with an example embodiment of the present disclosure.

FIG. 3 is a flow chart illustrating a method 300 for manufacturing a cut resistant fiber in accordance with an example embodiment of the present disclosure. Referring now to block 302, the method of manufacturing the cut resistant fiber comprises providing a sheet shaped wollastonite filler having a thickness of less than 10 micrometers ($\mu$m). The sheet shaped wollastonite filler provides hardness to the fiber and reduces breakage in the fiber during manufacturing. At block 304, the sheet shaped wollastonite filler is treated with a coupling agent at a first predefined temperature to obtain a uniform solution. In an example embodiment, the coupling agent is a silane coupling agent, such as one of a gamma-Aminopropyltriethoxysilane (KH550) agent, and a polyorganosiloxane (Penta-1006) agent. The first predefined temperature is 80° C.

At block 306, the method for manufacturing the cut resistant fiber comprises mixing the uniform solution with an Ultra High Molecular Weight Polyethylene (UHMWPE) resin at a second predefined temperature. The second predefined temperature is 140° C. The uniform solution is obtained by mixing a dispersing agent with the sheet shaped wollastonite filler and adding a fiber spinning solvent, such as the white oil. In an example, the sheet shaped wollastonite filler has a length less than 100 $\mu$m, and a width less than 50 $\mu$m.

In an example embodiment, the cut resistant fiber is obtained by mixing the fiber solution comprising the UHMWPE resin and the uniform solution, where the sheet shaped wollastonite filler has a thickness of 0.5 $\mu$m, a length of 8 $\mu$m and a width of 7 $\mu$m. In such a cut resistant fiber, a content of the sheet shaped wollastonite filler is 2.5% by volume. For the cut resistant fiber, a hot drawing temperature is 140° C. and the drawing ratio is 50.

In another example embodiment, the cut resistant fiber is obtained by mixing the fiber solution comprising the UHMWPE resin and the uniform solution, where the sheet shaped wollastonite filler has a thickness of 3 $\mu$m, a length of 20 $\mu$m and a width of 10 $\mu$m. The hot drawing temperature is 140° C. and the drawing ratio is 35. The content of the sheet shaped wollastonite filler in the fiber is 5% by volume. A higher percentage of the sheet shaped wollastonite filler in the fiber is indicative of more toughness and higher cut resistance of the fiber. For instance, the fiber having 5% sheet shaped wollastonite filler has a higher cut resistance than the fiber having 2.5% sheet shaped wollastonite filler and can reach a level C or higher in cut resistance.

It must be noted that, as used in this specification and the appended claims, the singular forms "a," "an," and "the" include plural referents unless the content clearly dictates otherwise.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments, but not other embodiments.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present disclosure are disclosed herein; however, it is to be understood that the disclosed embodiments are merely exemplary, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

While it is apparent that the illustrative embodiments herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present disclosure.

What is claimed is:

1. A cut resistant fabric comprising:
    an Ultra-High Molecular Weight Polyethylene (UHMWPE) material; and
    a sheet shaped wollastonite filler, the sheet shaped wollastonite filler being treated with a coupling agent and mixed with the UHMWPE material, wherein a thickness of the sheet shaped wollastonite filler is less than 10 micrometers (µm).

2. The cut resistant fabric of claim 1, wherein the sheet shaped wollastonite filler has a length less than 100 µm, and a width less than 50 µm.

3. The cut resistant fabric of claim 1, wherein the sheet shaped wollastonite filler has a Mohs hardness higher than 4.5, and a silica content higher than 50%.

4. The cut resistant fabric of claim 1, wherein the coupling agent comprises at least one of gamma-Aminopropyltriethoxysilane (KH550), and polyorganosiloxane (Penta-1006).

5. The cut resistant fabric of claim 1, wherein a proportion of the sheet shaped wollastonite filler in the fabric ranges from 2.5% to 5% by volume.

* * * * *